United States Patent
Sankrithi (10) Patent No.: US 9,452,817 B1
(45) Date of Patent: Sep. 27, 2016

(54) AIRCRAFT HAVING SPLIT LEVEL CABIN FLOORS

(75) Inventor: Mithra M. K. V. Sankrithi, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 1640 days.

(21) Appl. No.: 12/716,606

(22) Filed: Mar. 3, 2010

(51) Int. Cl.
*B64C 1/18* (2006.01)
*B64C 1/00* (2006.01)
*B64C 1/20* (2006.01)

(52) U.S. Cl.
CPC . *B64C 1/00* (2013.01); *B64C 1/20* (2013.01); *B64C 2001/0027* (2013.01)

(58) Field of Classification Search
CPC .... B64C 1/00; B64C 1/20; B64C 2001/0027
USPC ........................................................ 244/118.5
See application file for complete search history.

(56) References Cited

U.S. PATENT DOCUMENTS

| | | | |
|---|---|---|---|
| 1,859,807 A | | 5/1932 | Stout |
| D92,189 S | * | 5/1934 | Minshall et al. ............ D12/341 |
| 2,236,482 A | * | 3/1941 | Zindel ............................ 244/119 |
| 2,281,581 A | * | 5/1942 | Horton ............................ 105/327 |
| 2,761,637 A | * | 9/1956 | Brumby et al. ........... 244/118.5 |
| 3,948,469 A | | 4/1976 | Brown |
| 4,022,404 A | * | 5/1977 | Greiss ......................... 244/118.5 |
| 4,055,317 A | * | 10/1977 | Greiss ......................... 244/118.5 |
| 4,066,227 A | * | 1/1978 | Buchsel ....................... 244/118.6 |
| 4,641,796 A | | 2/1987 | Feifel |
| 4,653,707 A | * | 3/1987 | Hamilton et al. .......... 244/118.5 |
| 5,063,859 A | * | 11/1991 | Rader ............................ 105/340 |
| 5,115,999 A | * | 5/1992 | Buchsel et al. ............. 244/118.5 |
| 5,314,143 A | * | 5/1994 | Luria ........................... 244/118.5 |
| 5,395,075 A | * | 3/1995 | Sprenger et al. ........... 244/118.5 |
| 5,474,260 A | * | 12/1995 | Schwertfeger et al. ... 244/118.5 |
| 5,496,000 A | * | 3/1996 | Mueller ...................... 244/118.5 |
| 5,540,404 A | * | 7/1996 | Battenfield ................. 244/129.5 |
| 5,716,026 A | * | 2/1998 | Pascasio et al. ............ 244/118.6 |
| 5,752,673 A | * | 5/1998 | Schliwa et al. ............. 244/118.6 |
| 5,784,836 A | | 7/1998 | Ehrick |
| 5,875,997 A | * | 3/1999 | Al-Sabah .................... 244/118.5 |
| 5,992,797 A | * | 11/1999 | Seidel et al. ................ 244/118.5 |
| 6,056,239 A | * | 5/2000 | Cantu et al. ................. 244/118.5 |
| 6,073,883 A | | 6/2000 | Ohlmann |

(Continued)

FOREIGN PATENT DOCUMENTS

| | | |
|---|---|---|
| EP | 2460727 | 6/2012 |
| WO | WO 2006/005550 A1 | 11/2006 |
| WO | WO 2008/132087 A1 | 11/2008 |

OTHER PUBLICATIONS

VLCT—13, "A Commercial Transport for the 21$^{st}$ Century": California Polytechnic State University, San Luis Obispo, CA; May 14, 1993. *NASA Technical Report No. NASA-CR-195492.*

(Continued)

*Primary Examiner* — Steven Hawk
(74) *Attorney, Agent, or Firm* — Parsons Behle & Latimer (57) ABSTRACT

An aircraft for carrying passengers and/or cargo has first, second and third cabins arranged in a split level floor configuration within a fuselage. The cabin floors are connected by stairs, elevators or escalators. Two of the cabins are stacked above a reduced height lower hold which acts as an energy absorbing crush zone in the event of a crash.

23 Claims, 10 Drawing Sheets

(56) References Cited

U.S. PATENT DOCUMENTS

| | | | | |
|---|---|---|---|---|
| 6,152,400 | A | 11/2000 | Sankrithi | |
| 6,237,872 | B1* | 5/2001 | Bar-Levav | 244/118.5 |
| 6,478,253 | B1* | 11/2002 | Seidel | 244/118.5 |
| 6,616,098 | B2* | 9/2003 | Mills | 244/118.5 |
| 6,666,406 | B2 | 12/2003 | Sankrithi | |
| 6,702,232 | B2* | 3/2004 | Dovey et al. | 244/118.5 |
| 6,705,567 | B2* | 3/2004 | Dong et al. | 244/118.5 |
| 6,772,977 | B2* | 8/2004 | Dees et al. | 244/118.5 |
| 6,808,142 | B2* | 10/2004 | Oki | 244/118.5 |
| 7,290,735 | B2* | 11/2007 | Saint-Jalmes et al. | 244/118.5 |
| 7,395,989 | B2* | 7/2008 | Saint-Jalmes et al. | 244/118.5 |
| 7,536,958 | B2* | 5/2009 | Bravo et al. | 105/340 |
| 7,621,482 | B2 | 11/2009 | Sankrithi | |
| 7,644,888 | B2* | 1/2010 | Eakins et al. | 244/118.5 |
| 2002/0033432 | A1 | 3/2002 | Mikosza | |
| 2002/0153454 | A1 | 10/2002 | Seidel | |
| 2003/0029967 | A1* | 2/2003 | Mills | 244/118.5 |
| 2007/0125909 | A1* | 6/2007 | Seiersen et al. | 244/118.5 |
| 2008/0179457 | A1* | 7/2008 | Guering | 244/118.5 |
| 2008/0191087 | A1 | 8/2008 | Cros | |
| 2008/0245925 | A1 | 10/2008 | Udall | |
| 2008/0251641 | A1* | 10/2008 | Sprenger | 244/118.5 |
| 2008/0309201 | A1 | 12/2008 | Ota | |
| 2010/0155531 | A1* | 6/2010 | Lynas | 244/118.5 |

OTHER PUBLICATIONS

Bauhaus Luftfahrt, "Claire Liner"; Prof. Frediani, Universita' di Pisa, and Atena Engineering GmbH. *Presentation*.

JAL—Japan Airlines "MD-11 / MD-11 Stretch, Executive Briefing for JAL", McDonnell Douglas, Dec. 1989. *Presentation*.

'Imagining the aircraft of the future', Prof. Dieter Schmitt/Bauhaus Luftfahrt, ASD Focus, Issue 04, Summer 2009, pp. 14-15 Jul. 1, 2009.

Prof. Dr. Mirko Hornung/Bauhaus Luftfahrt, "Aviation in 2030+: Visions, Concepts and Chances of Realisation", Nov. 23, 2011, Presentation, Royal Aeronautical Society, Toulouse Branch, pp. 26-29 Nov. 23, 2011.

US Patent and Trademark Office; Non-Final Office Action for U.S. Appl. No. 13/973,846 dated Mar. 21, 2014.

Bauhaus Luftahrt, Paper, ACARE Targets: For Growth and Sustainability, MTU Press Conference, Munich, Jul. 18, 2007.

European Patent Office; Search Report for EP Application No. 14172650.5 dated Nov. 12, 2014.

Beal, Pamela, et al; VLCT-13, "A Commercial Transport for the 21st Cetnry;" California Polytechnic State University, San Luis Obispo, CA; May 14, 1993, NASA Technical Report No. NASA-CR-195492, May 14, 1993.

Duran, David, et al; The AC-120; "The Advanced Commercial Transport Preliminary Design of a 100 to 150 Passenger Commercial Transport;" Presented to Professor Robert van't REit; Aeronautical Engineering Department, California Polytechnic State University, May 14, 1993.

Swihart, John M. et a; "Low Direct Operating Cost Transpacific Commercial Transport Family," American Institute of Aeronautics, Inc., 1997. Jan. 1, 1997.

\* cited by examiner

AIRCRAFT HAVING SPLIT LEVEL CABIN FLOORS

TECHNICAL FIELD

This disclosure generally relates aircraft fuselage configurations and cabin layouts, and deals more particularly with a split level cabin floor configuration.

BACKGROUND

The operating efficiency of commercial and military aircraft may depend upon the efficient use of the volume of space within the aircraft's fuselage. Optimizing the use of fuselage volume may allow the aircraft to carry higher payloads of passengers and/or cargo. The ability to carry higher revenue payloads reduces operating expenses relative to revenue, while simultaneously reducing fuel burn per seat-kilometer and/or tonne-kilometer, and also reducing $CO_2$ production per seat-kilometer and/or tonne-kilometer. The challenge of optimizing the use of available fuselage volume is complicated by the need to provide for passenger comfort and safety while accommodating associated cargo requirements. Finally, passenger cabin layout and design must take into consideration the need for crash landing energy absorption in lower areas of the fuselage.

Accordingly, there is a need for an aircraft fuselage that optimizes use of fuselage volume while satisfying the need for passenger safety and comfort with adequate cargo storage. The disclosed embodiments are intended to satisfy this need.

SUMMARY

The disclosed embodiments provide a fuselage design and cabin layout that optimizes use of the fuselage volume while satisfying the need for crash worthiness and cargo carrying requirements. A split level cabin floor layout within a fuselage of uniform cross section provides maximum passenger seating capacity. Cargo decks beneath passenger seating areas provide crushable zones that absorb energy during crash landings in order to protect passengers. The split level cabin layout includes upper and lower stacked cabins connected to an intermediate level main cabin through one or more sets of stairs, elevators or escalators. In one embodiment, a second set of stairs allows passengers to traverse between the upper and lower cabins without passing through the main cabin. Stairs connecting the main cabin to the upper and lower cabins may be longitudinally spaced, as required, to accommodate underlying cargo bays and/or landing gear wheel wells. In another embodiment, space above the main cabin is utilized as a rest compartment for crews that is accessible by stairs or ladders. In some embodiments, where the lower cabin is near the waterline of the aircraft, split "dutch" doors in the fuselage provide passenger egress while protecting against the inflow of water into the cabin in the event of an emergency water landing.

According to one disclosed embodiment, an aircraft comprises a fuselage, a first cabin, a split level cabin longitudinally spaced from the first cabin and a lower hold. The split level cabin includes an upper second cabin and a lower third cabin. The lower hold is beneath at least a portion of the lower third cabin. The first cabin has a first floor and the second cabin has a second floor that is above the level of the first floor. The third cabin has a third floor below the level of the first floor. In one example, the second and third cabins are located forward of the first cabin, while in another embodiment, the second and third cabins are located aft the first cabin. The aircraft may further comprise means for allowing passengers to traverse between the first cabin and each of the second and third cabins, which may include at least one of stairs, an escalator and an elevator. The aircraft may further comprise a first cargo deck located beneath the first cabin floor. The aircraft may further comprise at least one set of stairs allowing passengers to traverse directly between the second and third cabins without traversing through the first cabin.

According to another embodiment, an aircraft comprises a fuselage, a first cabin having a first floor and a split level cabin longitudinally spaced from the first cabin. The split level cabin includes an upper second cabin having a second floor above the first floor and a lower third cabin having a third floor below the level of the first floor. The aircraft further comprises means for allowing passengers and crew to traverse between the first cabin and each of the second and third cabins, and an upper compartment stacked above the first cabin, wherein the upper compartment has a fourth floor above the level of the second floor. Means, such as stairs or a ladder are provided for allowing passengers and crew to traverse between the second cabin and the upper compartment.

According to still another embodiment, an aircraft comprises a fuselage, a first cabin in the fuselage having a first floor, and a split level cabin longitudinally spaced from the first cabin. The split level cabin includes an upper second cabin having a second floor above the level of the first floor, and a lower third cabin beneath the upper second cabin and having a third floor below the level of the first floor. The aircraft further comprises powered transport means for vertically transporting payloads between the first, second and third cabins. The powered transport means may comprise an elevator longitudinally positioned within the fuselage between the first cabin and the split level cabin.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
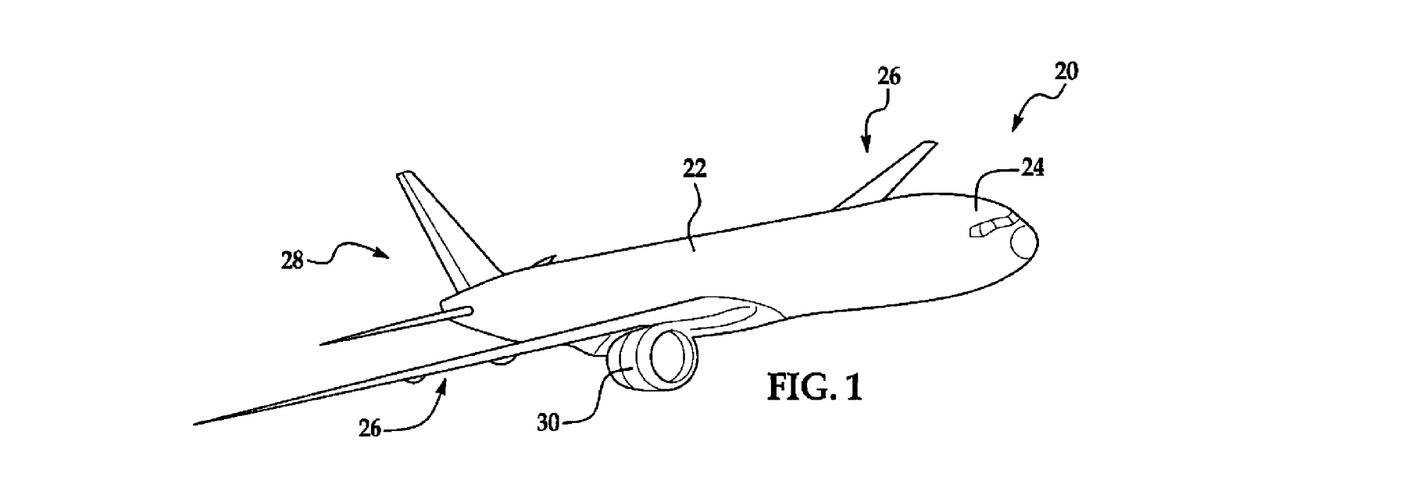
FIG. 1 is an illustration of a perspective view of a typical aircraft having a fuselage employing a split level cabin configuration according to the disclosed embodiments.
Figure 2:
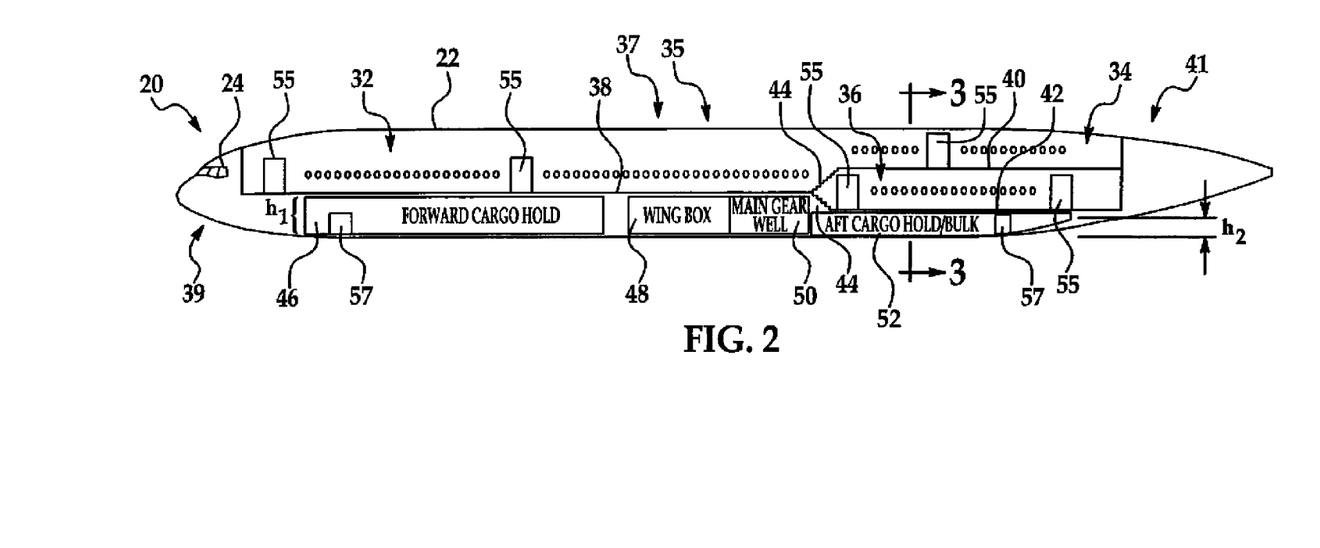
FIG. 2 is an illustration of a side view of the aircraft shown in FIG. 1, partially in section with the wings and tail assembly removed for clarity.
Figure 3:
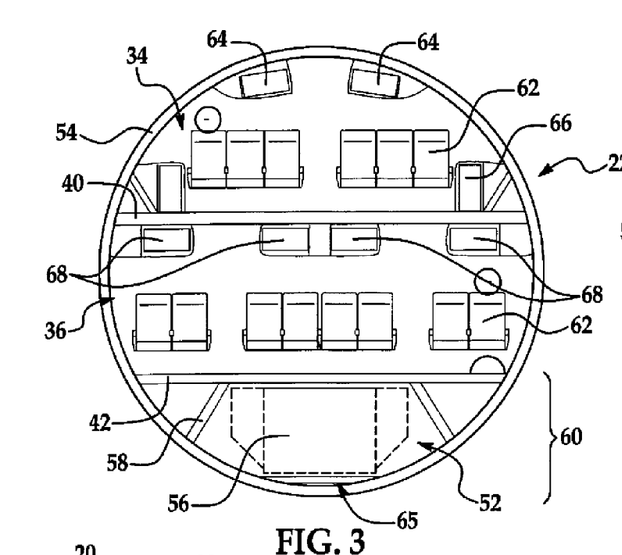
FIG. 3 is an illustration of a sectional view taken along the line 3-3 in FIG. 2.

Referring first to FIGS. 1-3, an aircraft 20 comprises a generally cylindrical fuselage 22 having an attached wing assembly 26 and a tail assembly 28. In the illustrated example, the aircraft 20 is propelled by jet engines 30 mounted on the wing assembly 26, as best seen in FIG. 1. The aircraft 20 may carry any of various types of payloads, including cargo and passengers. As used herein, the term "passengers" is intended to include all forms of passengers including crews, pilots, attendants and service personnel.

Referring now particularly to FIGS. 2 and 3, the fuselage 22 broadly includes a forwardly positioned crew cockpit 24 and a split level cabin layout 35 comprising a first, main level cabin 32 positioned immediately aft of the cockpit 24, and upper and lower, second and third cabins 34, 36 positioned between the main cabin 32 and the tail assembly 28 (FIG. 1). Cabins 32, 34 and 36 respectively include cabin floors 38, 40 and 42 for supporting passenger seats 62 and/or cargo.

Although not shown in the figures, each of the floors 38, 40, 42 may have embedded hardware for attaching payloads to the floors 38, 40, 42. For example, one or more of the floors 38, 40, 42 may have multiple seat tracks (not shown) that allow the passenger seats 62 to be attached to the floors 38, 40, 42 in various flexible configurations, and which allow the seats 62 to be removed in order to allow other forms of payloads, such as cargo, to be carried in the cabins 32, 34, 36. The upper cabin floor 40 is positioned above the level of the main cabin floor 38, while the lower cabin floor 42 is positioned below the level of the main cabin floor 38. Cabin floors of different or varying depth may be used to best optimize cabin heights relative to floor structure weight.

The upper and lower cabins 34, 36, are vertically stacked and are respectively are connected with each other, and with the main cabin 32 by two flights of stairs 44 which, in the illustrated example are longitudinally aligned within the fuselage 22. Flights of stairs that are transversely aligned or are aligned at an angle or are curved/nonlinear are also possible in variant embodiments. Stairs 44 provide a means of allowing passengers to traverse between cabins 32, 34 and 36. The number of stairs in each flight thereof may be the same or different. In those embodiments where the two flights have a different number of stairs 44, the upper and lower cabin floors 40, 42 respectively, will be at different heights relative to the main cabin floor 38.

In typical embodiments, the upper floor 40 may be displaced between 5 and 75 inches above the level of the first cabin floor 38, and each of the flights of stairs 44 may comprise between 1 and 15 stairs. Varying values of step rise and step length and step overhang are possible for variant embodiments. Similarly, the lower floor 42 may be displaced between 5 and 75 inches below the level of the first cabin floor 38, and the stairs connecting the first main cabin 32 with the lower aft cabin 36 may comprise between 1 and 15 stairs. Although not shown in FIGS. 2 and 3, an elevator, escalator or other means of transporting passengers between the floors 38, 40, 42 are possible. Similarly, although not shown in FIGS. 2 and 3, galley cart lift(s) may be provided as means for transporting galley carts such as galley carts and beverage carts between the floors 38, 40 and 42. In the illustrated example, doors 55 are provided in cabins 34 and 36 to allow emergency passenger egress and/or servicing of the cabins.

A first cargo deck comprising a first forward cargo deck or hold 46 is disposed beneath the main cabin floor 38. The forward cargo deck 46 has a volume partially defined by a height $h_1$ that will permit carrying standardized, full size LD-3 cargo containers as well as pallets and/or bulk cargo. The forward cargo deck 46 can be loaded with the cargo containers or pallets via a cargo door (not shown) on either the right or left side of the fuselage, as is well known in the art. A center wing box 48 and main landing gear wheel well 50 are positioned immediately aft of the forward cargo deck 46, beneath the main cabin floor 48. The wing box 48 forms part of a structure that mounts the wing assembly 26 (FIG. 1) on the fuselage 22. A lower aft hold 52 which may comprise an aft cargo hold or deck is positioned immediately aft of the main landing gear well 50, beneath the lower cabin floor 42. The lower hold 52 may include a door 57 allowing loading/unloading of cargo and has a height $h_2$ that may be less than the height $h_1$ of the forward cargo deck 46. While the door 57 is shown on the left side of the airplane fuselage, in alternate airplane configurations the door 57 may alternatively be located on the right side of the airplane.

The reduced height $h_2$ of the lower hold 52 accommodates the height required for the stacked aft cabins 34, 36, while still providing sufficient volume to accommodate smaller cargo, including bulk cargo, as well as some reduced height unit cargo devices from a set including LD3-45, LD3-45W, LD3-46, LD3-46W cargo container, and other containers between 20 and 60 inches in height. In alternate embodiments the lower aft hold 52 may comprise a reduced height volume that is adapted to accommodate selected airplane systems (including but not limited to line-replaceable-units or LRUs, avionics systems, flight controls systems, environmental control systems, entertainment systems, sensor systems, water systems, waste systems, electrical systems, hydraulic systems, pneumatic systems, oxygen systems, fire suppression systems, and/or auxiliary power systems), rather than bulk cargo or unit cargo devices.

A typical reduced height door 57 that would accommodate reduced height LD3-45 containers may have a height of approximately 49 inches and a width of approximately 65 inches. In contrast, a typical full height cargo pallet door 57 in the forward cargo deck 46 may have a height of approximately 69 inches and a width of approximately 105 inches.

FIG. 3 illustrates a typical seating layout wherein the lower cabin 36 is provided with 8-abreast twin-aisle seating and the upper cabin 34 is provided with 6-abreast single-aisle seating. Seats 62 in the upper cabin 34 are supported on and attached to the upper cabin floor 40, while seats 62 in the lower cabin 36 are attached to and supported on the lower cabin floor 42, using seat tracks (not shown) or other known methods of attaching seats to floors on aircraft. Seat tracks can be provided for permitting varying numbers of seats abreast with different seat sizes. For example if the illustrated 8-abreast twin-aisle seating in the lower cabin 36 has representative seat bottom widths of 18.5 inches, corresponding to a high-comfort economy class, alternate seating arrangements could be selectable options such as 9-abreast basic economy-class seats at 17 inches seat bottom width, or 7-abreast high-width business class seats or 6-abreast very-high-width first class sleeper seats or private modules.

Both the upper and lower cabins 34, 36 have a height sufficient to allow normal passenger standing and traversal. For example, these cabins may have aisleway maximum headroom of approximately 80 inches or greater to meet typical widebody aircraft standards, or at least approximately 72 inches or greater to meet minimum standards for small transport aircraft. The upper cabin 34 includes overhead storage bins 64 as well as side storage bins 66. Similarly, the lower cabin 36 includes overhead storage bins 68. Stowage bins may be shelf bins, pivot bins, translating bins or other stowage bin types known in the art. As mentioned above, the lower aft hold 52 may comprise an aft cargo deck beneath the lower cabin floor 42 which may accommodate reduced height cargo containers 56, as well as bulk cargo. The volume of the fuselage 22 below the lower cabin floor 42 which contains the aft cargo deck may include various framework, such as stanchions 58 which both support the lower cabin floor 42 and aid in absorbing impact energy within a crushable zone 60 at the bottom of the fuselage 22 during a crash landing. Preferably, the fuselage 22 includes at least approximately 30 vertical inches of lower fuselage structure between the upper surface of the lower cabin floor 42 and the lower keel surface 65 of the fuselage 22.

The fuselage 22 will also accommodate systems not shown) such as heating, ventilation and air conditioning systems, lighting systems, passenger service units and emergency systems, routing space for items such as electrical wiring, avionics and flight controls, control systems, hydraulic and/or pneumatic tubing, and a variety of payloads features and amenities such as seats, windows, lavatories, galleys, stowage etc.

In the example illustrated in FIGS. 1-3 the skin covered frame 54 that forms the cross sectional shape of the fuselage 22 is substantially circular, however, other cross sectional shapes such as an oval or piecewise-circular or other non-circular cross-sectional shapes are possible as well. The illustrated fuselage 22 has a main central body or section 39 that is of generally uniform cross section throughout its length, and tapered ends or sections 39, 41 that have a reduced diameter cross section. The cabins 32, 34, 36 are largely contained within the main body section 37 but may include portions that extend into the tapered ends 39, 41 of the fuselage 22.

Figure 4:
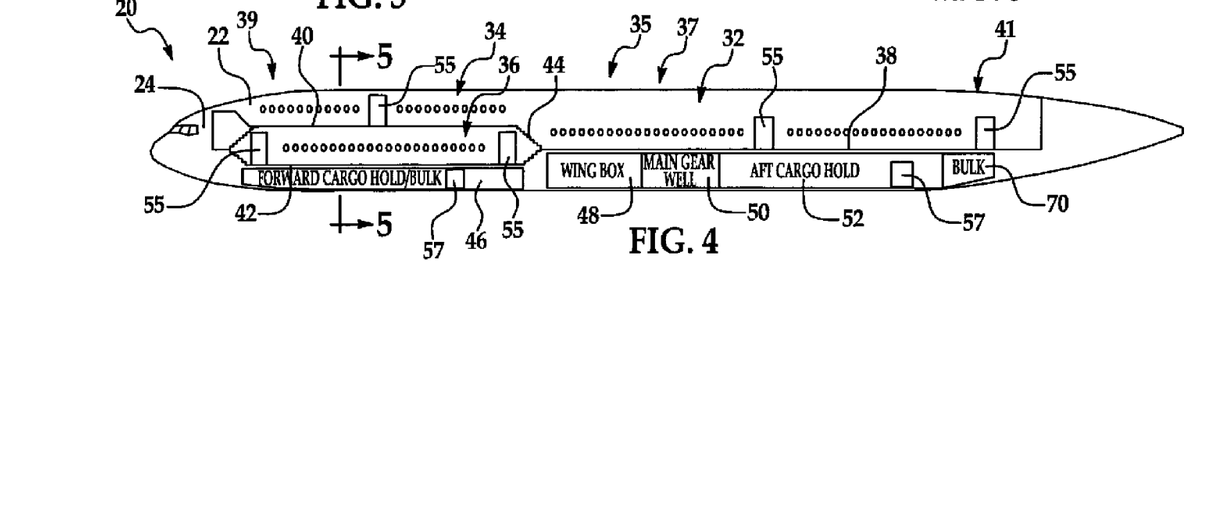
FIG. 4 is an illustration similar to FIG. 2 but showing an alternate embodiment of the split level cabin layout.
Figure 5:
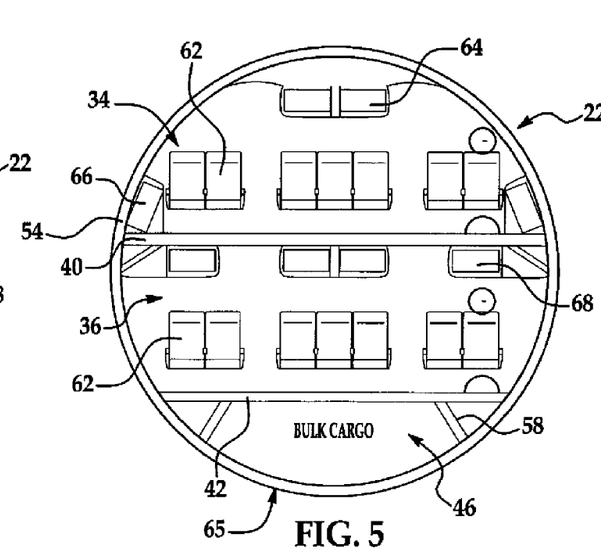
FIG. 5 is an illustration of a sectional view taken along the line 5-5 in FIG. 4.

FIGS. 4 and 5 illustrate another embodiment of a fuselage 22 having a split level cabin 35 in which the upper and lower stacked cabins 34, 36 are positioned forward in the fuselage 22, between the wing box 48 and the cockpit 22. In this example, the forward cargo deck 46 is of reduced height to accommodate the standing room height required within upper and lower cabins 34 and 36 which are stacked above the forward cargo deck 46. The main cabin 32 is positioned in an aft section of the fuselage 22, above the wing box 48, main landing gear well 50 and aft cargo hold 52, which may be of a height greater than that of the forward cargo deck 46 in order to accommodate full size cargo containers. In this example, an additional cargo hold 70 behind the aft cargo deck 52 may be possible for storing bulk cargo. The upper and lower cabins 36 are connected with the main aft cabin 32 by means of two flights of stairs 44.

FIG. 5 illustrates one seating layout for the aircraft shown in FIG. 4, in which both the upper and lower cabins 34, 36 are provided with seats 62 arranged in a 7-abreast, twin-aisle configuration. As previously mentioned, the forward cargo deck 46 is of reduced height suitable for carrying bulk storage. Also, similar to the embodiment shown in FIGS. 1-3, the volume of the fuselage 22 beneath the lower cabin floor 42 may include various energy absorbing, reinforcing structures such as stanchions 58 in order to absorb impact energy during a crash landing. It should be noted here that the cross-section configuration shown in FIG. 5 could be combined with the split-level layout of FIG. 2, and the cross-section configuration of FIG. 3 could be combined with the split-level layout of FIG. 4, in further variant embodiments.

Figure 6:
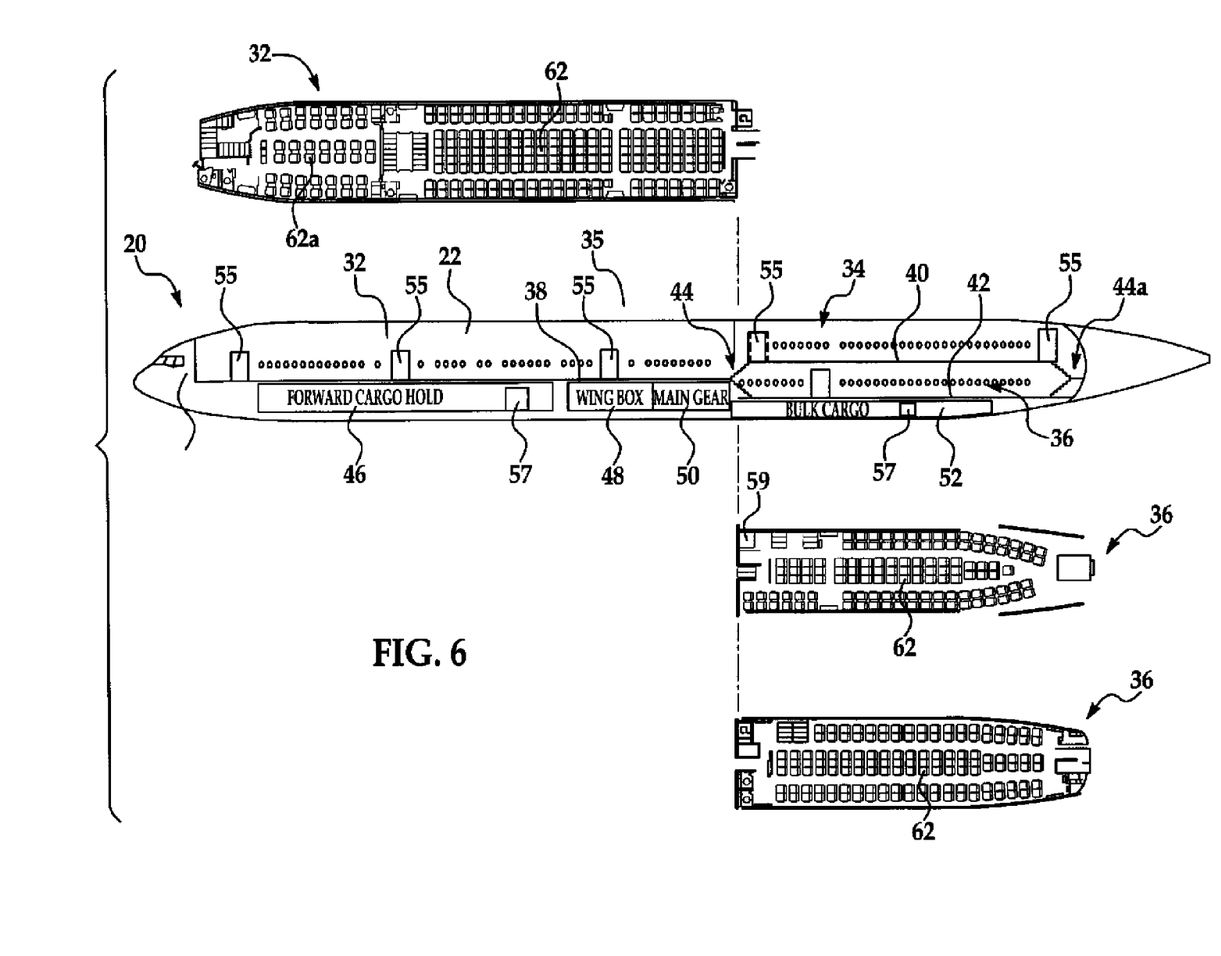
FIG. 6 is an illustration similar to FIG. 2 but showing alternate embodiments of connecting stairs and seat layouts for each of the cabins.

Attention is now directed to FIG. 6 which illustrates an aircraft 20 having a fuselage 22 provided with a split level cabin 35 similar to that shown in FIGS. 1-3, but with the provision of an additional set of stairs 44a at the aft end of the fuselage 22 which allows passengers to traverse directly between the upper and lower cabins 34, 36 without traversing the main cabin 22. Thus, passengers may traverse between the upper and lower cabins 34, 36 by using either the forward stairs 44 or the aft stairs 44a. As previously mentioned, it may also be possible to provide one or more elevators (not shown) or escalators (not shown) to allow passengers to traverse between cabins 32, 34 and 36 In this particular example, seating 62 is arranged in a double aisle configuration in cabins 32, 34 and 36. It should be noted here that because the upper and lower aft cabins 34, 36 are located between the wing box 48 and the tail assembly 28 (FIG. 1), emergency passenger egress through doors 55 in the fuselage in both cabin areas is free of obstructions. A cart lift allows carts (not shown) to be vertically transported between floors 42 and 44.

Figure 7:
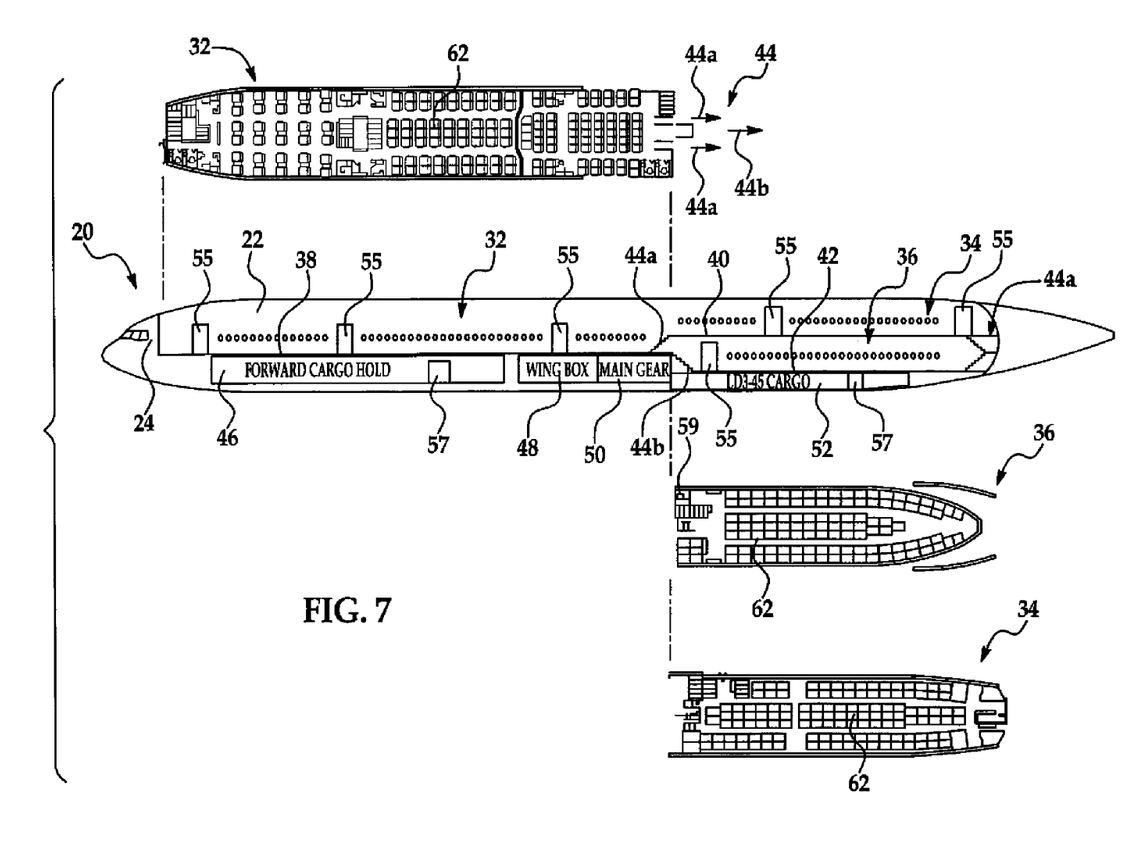
FIG. 7 is an illustration similar to FIG. 2 but showing alternate another embodiment of connecting stairs and seat layouts for each of the cabins.

Attention is now directed to FIG. 7 which illustrates a cabin layout generally similar to that shown in FIG. 6, but wherein the forward stairs 44 connecting the aft upper and lower cabins 34, 36 with the main forward cabin 32 are spaced or staggered relative to each other in the longitudinal direction of the fuselage of the aircraft 20. The forward stairs 44 comprises split, dual up stairs 44a, and extra wide, center down stairs 44b. The configuration shown in FIG. 7 may also include cart lifting means 59 for transporting galley carts between the levels of the cabin floors 38, 40, 42.

Figure 8:
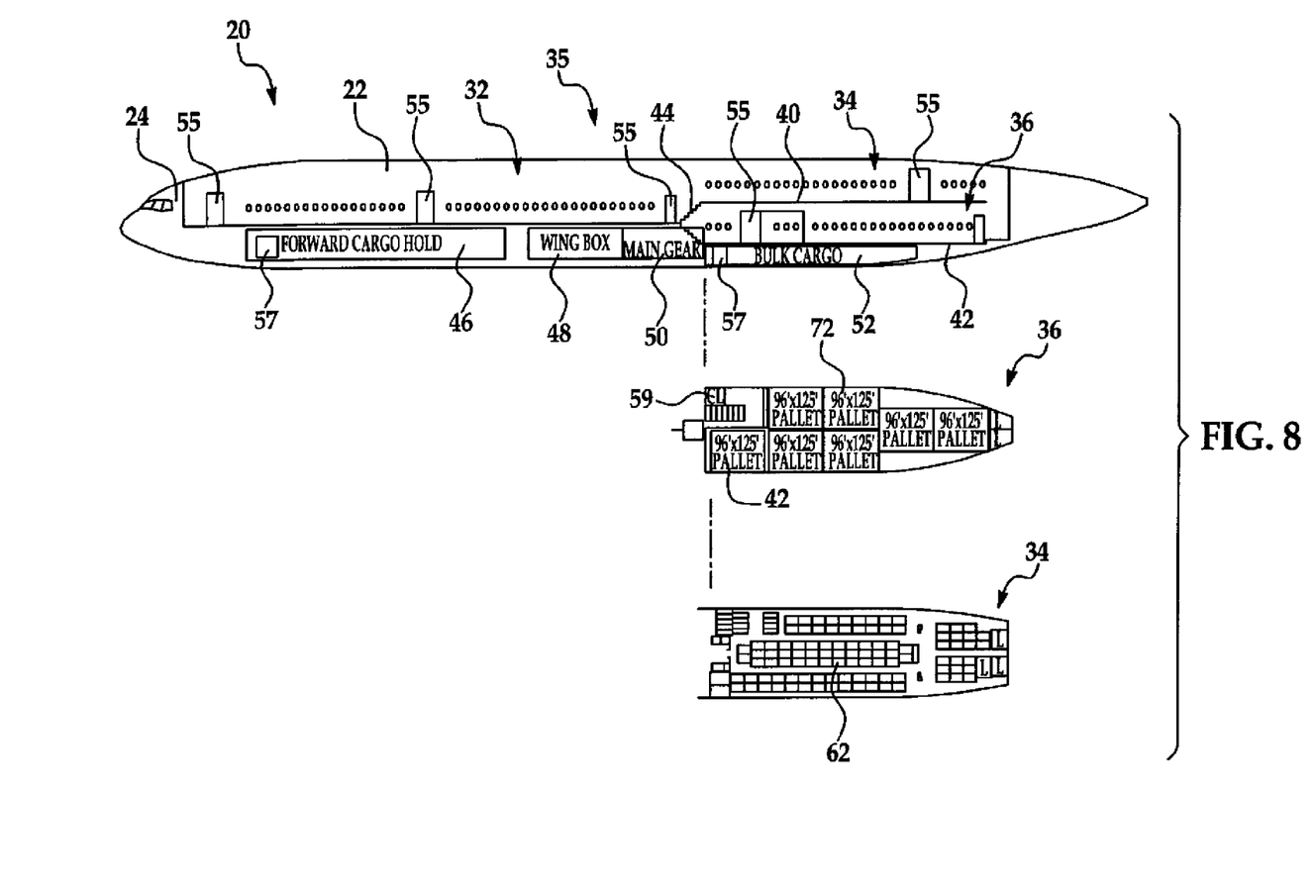
FIG. 8 is an illustration similar to FIG. 2 showing alternate layouts for the upper and lower cabins wherein the lower cabin is employed for cargo.

FIG. 8 illustrates another fuselage layout employing a split level cabin 35, but wherein the lower aft cabin 36 is adapted to carry either passengers or cargo. In this particular example, the lower cabin floor 42 has been adapted to support cargo pallets 72, however floor 42 may be readily adapted to have passenger seats mounted thereon. This flexible configuration allows airline customers to change their mix of passenger and cargo payloads on different routes and missions.

Figure 9:
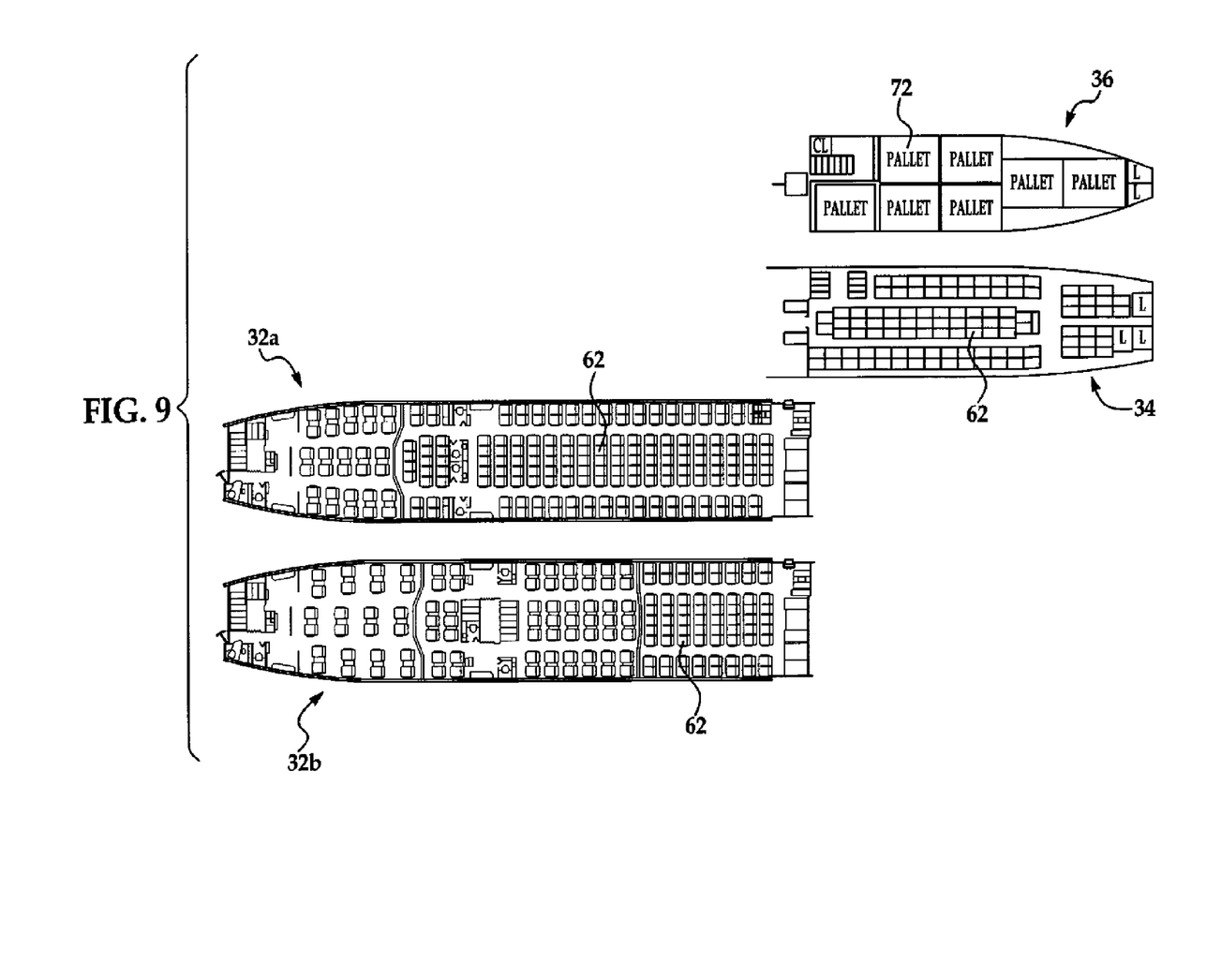
FIG. 9 is an illustration of a plan view of alternate cabin layouts for the aircraft shown in FIG. 8.

FIG. 9 illustrates another embodiment of the layout for the split level cabin where the main level cabin may be provided with a dual class seating arrangement 32a or a tri-class arrangement 32b. In this example, the lower aft deck 36 is adapted for carrying cargo pallets 72, with seven pallets shown but optionally convertible to varying mixes of cargo pallets and passenger seats, separated by an appropriate cargo barrier (not shown).

Figure 10:
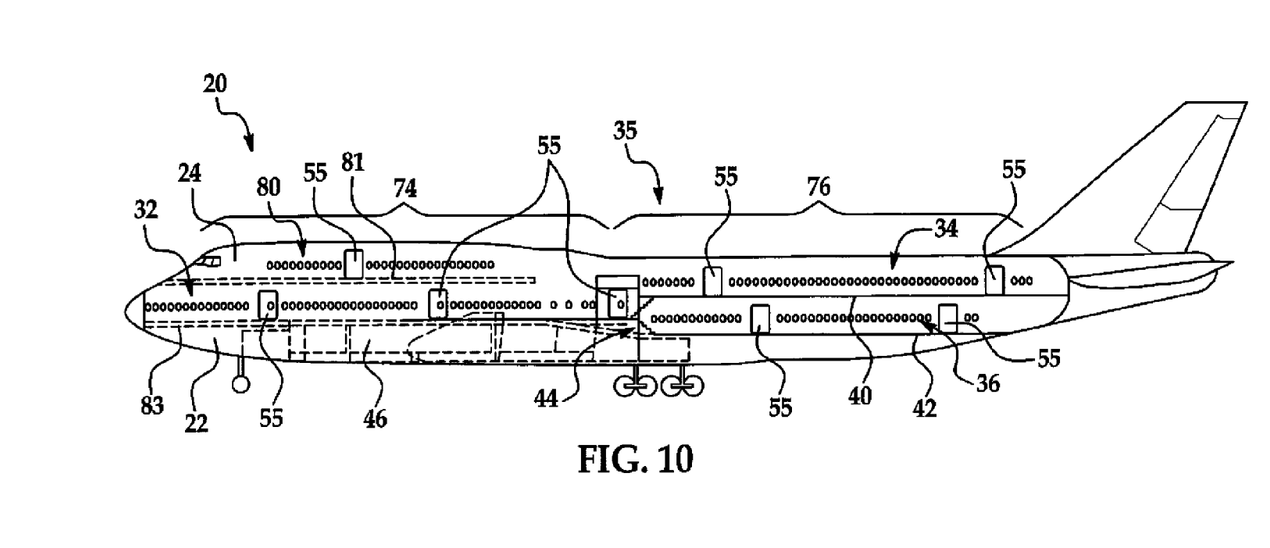
FIG. 10 is an illustration of a side view of a "jumbo" aircraft having the split level cabin of the disclosed embodiments.
Figure 10A:
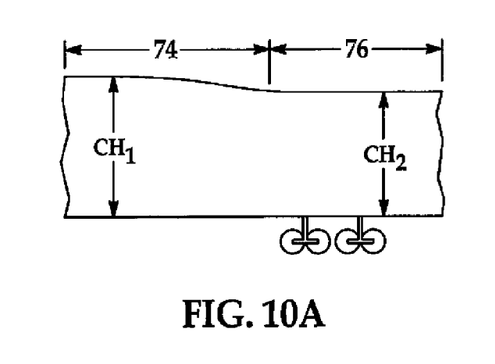
FIG. 10A is an illustration of a side view of a portion of the aircraft depicted in FIG. 10, showing difference in crown height between the fore and aft sections of the fuselage.

FIG. 10 illustrates a so-called "wide body" or "jumbo jet" 20 having a fuselage 22 provided with a double lobe forward section 74 and an aft section 76 that has a reduced cross sectional area shape. The forward section 74 may have a substantially constant cross section along its length and has a crown height $CH_1$ as shown in FIG. 10A. The aft section 76 also may have a substantially uniform cross section along its length and has a crown height $CH_2$ which is less than the crown height $CH_1$. The forward section 74 of the fuselage 72 includes a fourth cabin comprising a forward, upper level cabin 80 positioned aft of the cockpit 24, above a first forward main cabin 32. The forward, upper level cabin 80 has a floor 81, and the forward main cabin 32 has a floor 83. Floors 81, 83 may be connected by a set of stairs (not shown) typically located at the forward end of cabins 32, 80 to allow passengers and/or crews to traverse between these cabins.

The aircraft 20 further includes a split level cabin 35 formed by upper and lower aft stacked cabins 34, 36 in combination with the main forward cabin 32. The upper and lower stacked cabins 34, 36 are located aft of the main forward cabin 32, substantially within the aft section 76 of the fuselage 22 and may include a reduced height aft cargo deck 52 beneath the lower aft cabin 36 which is longitudinally spaced from a forward cargo deck 46 located beneath the main forward cabin 32. In this embodiment, the floor 40 of the upper aft cabin 34 is located above the main forward cabin floor 83, but below the level of the upper forward cabin floor 81. As in previous embodiments, the main forward cabin 32 is connected to the upper and lower aft cabins 34, 36 by a set of stairs 44.

Figure 11:
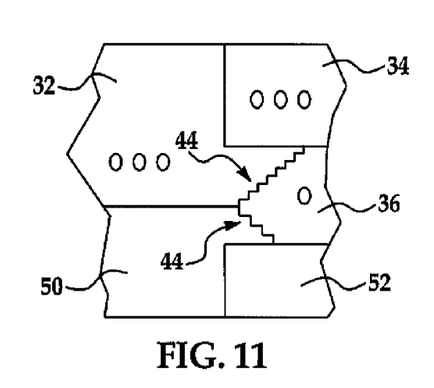
FIG. 11 is an illustration of a diagrammatic side view showing one stair layout for connecting the main cabin with the upper and lower cabins.
Figure 12:
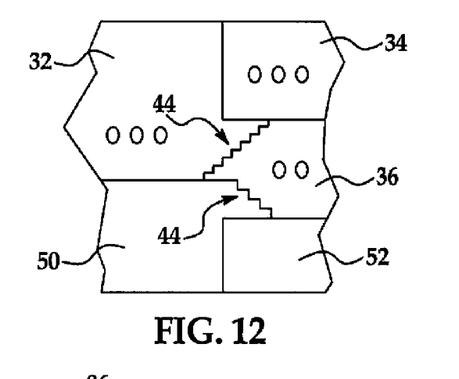
FIG. 12 is an illustration similar to FIG. 11 but showing an alternate stair layout.

FIG. 11 illustrates, on a larger scale, an arrangement of stairs 44 similar to that shown in FIG. 2 in which the two flights of stairs 44 connecting the main cabin 32 with the aft upper and lower cabins 34, 36 are substantially aligned in the longitudinal direction of the aircraft 20. FIG. 12 illustrates a stair layout in which flights of stairs 44 are longitudinally spaced or staggered from each other in order to accommodate varying cabin arrangements, similar to the embodiment shown in FIG. 7.

Figure 13:
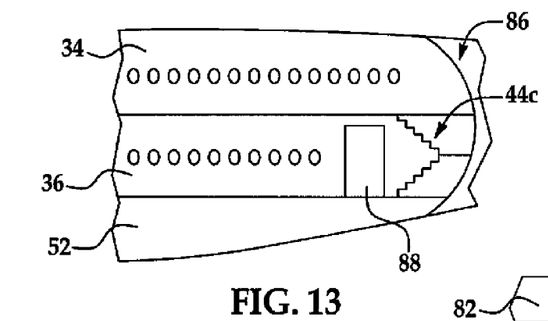
FIG. 13 is an illustration of a diagrammatic, side view of a rear portion of an aircraft that includes a second set of stairs directly connecting the upper and lower cabins.

FIG. 13 illustrates, on a larger scale, the aft flights of stairs 44c adjacent the aft bulkhead 86, which connect the aft upper and lower cabins 34, 36 shown in the embodiments of FIGS. 6 and 7.

Figure 14:
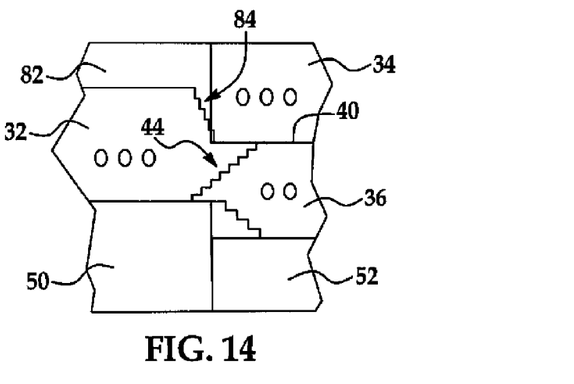
FIG. 14 is an illustration of a diagrammatic view of a fuselage layout that includes a compartment above the main cabin that is accessible from the upper cabin.
Figure 15:
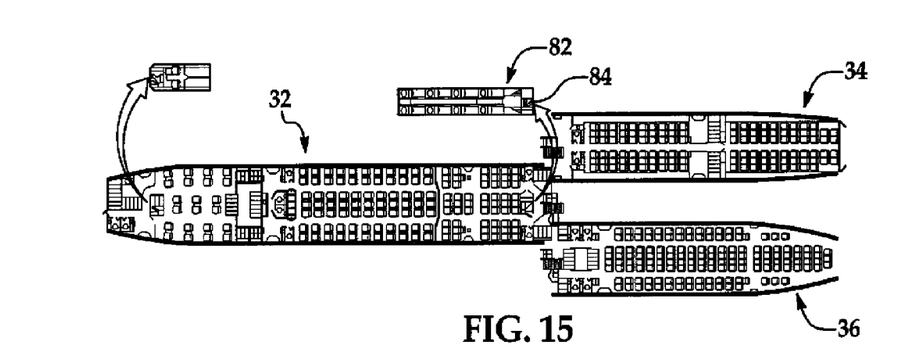
FIG. 15 is an illustration of a plan view of an aircraft having split level which includes the overhead crew rest area shown in FIG. 14.

FIGS. 14 and 15 illustrate another embodiment of a split level cabin configuration comprising a main forward cabin 32, and upper and lower aft cabins 34, 36 that are connected by stairs 44. In this example, however, an upper compartment 82 is provided above the main cabin 44 which may be used for any of various purposes, such as a rest area for crew use. The upper compartment 82 may be accessed from the upper aft cabin 34 by a set of stairs or ladder 84 which extend between the upper cabin floor 40 and compartment 82. Positioning the crew rest area compartment above the main cabin 32 eliminates the need for a comparable rest area on the main cabin floor 38, thereby freeing up additional space that may be employed for passenger seating. Alternate egress means (not shown) connecting the upper compartment 82 with the main cabin 44 may optionally be provided, for emergency or normal use.

Figure 16A:
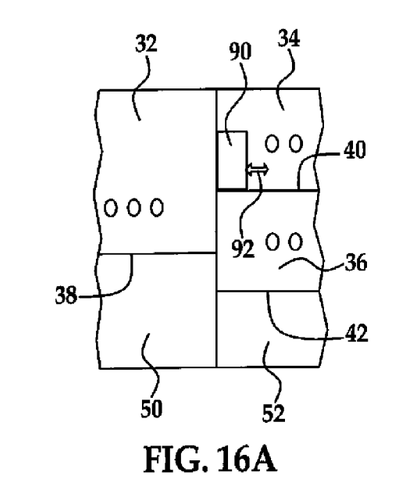
FIGS. 16A-16C are illustrations of diagrammatic side views of an aircraft having split level cabins employing an elevator.
Figure 16B:
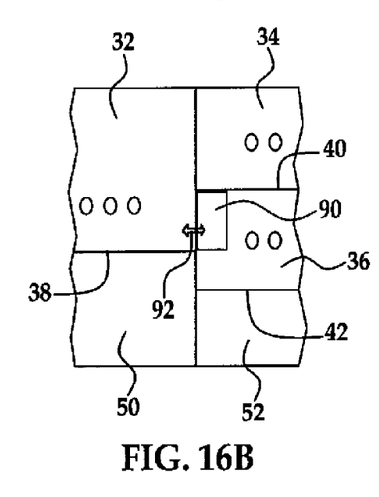
Figure 16C:
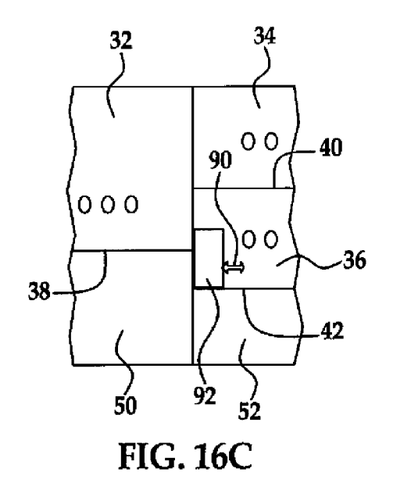

Referring now to FIGS. 16A-16C, as previously mentioned, an elevator or similar transport means 90 may be provided in the aircraft 20 in order to transport passengers, cargo, galley carts, wheelchairs and the like between the cabin floors 38, 40, 42. As shown in FIG. 15A, the elevator 90 is positioned at the level of the upper cabin floor 40, allowing loading/unloading as shown by the arrow 92. In FIG. 16B, the elevator 90 is shown as having descended to the level of the main cabin floor 38 thus transporting passengers, etc. from the upper aft cabin 34 to the main cabin 32. FIG. 15C shows the elevator 90 having descended further to the level of the lower aft cabin floor 42. Alternate elevator or cart lift devices may be configured with two doors (as illustrated) or a single door.

Figure 17:
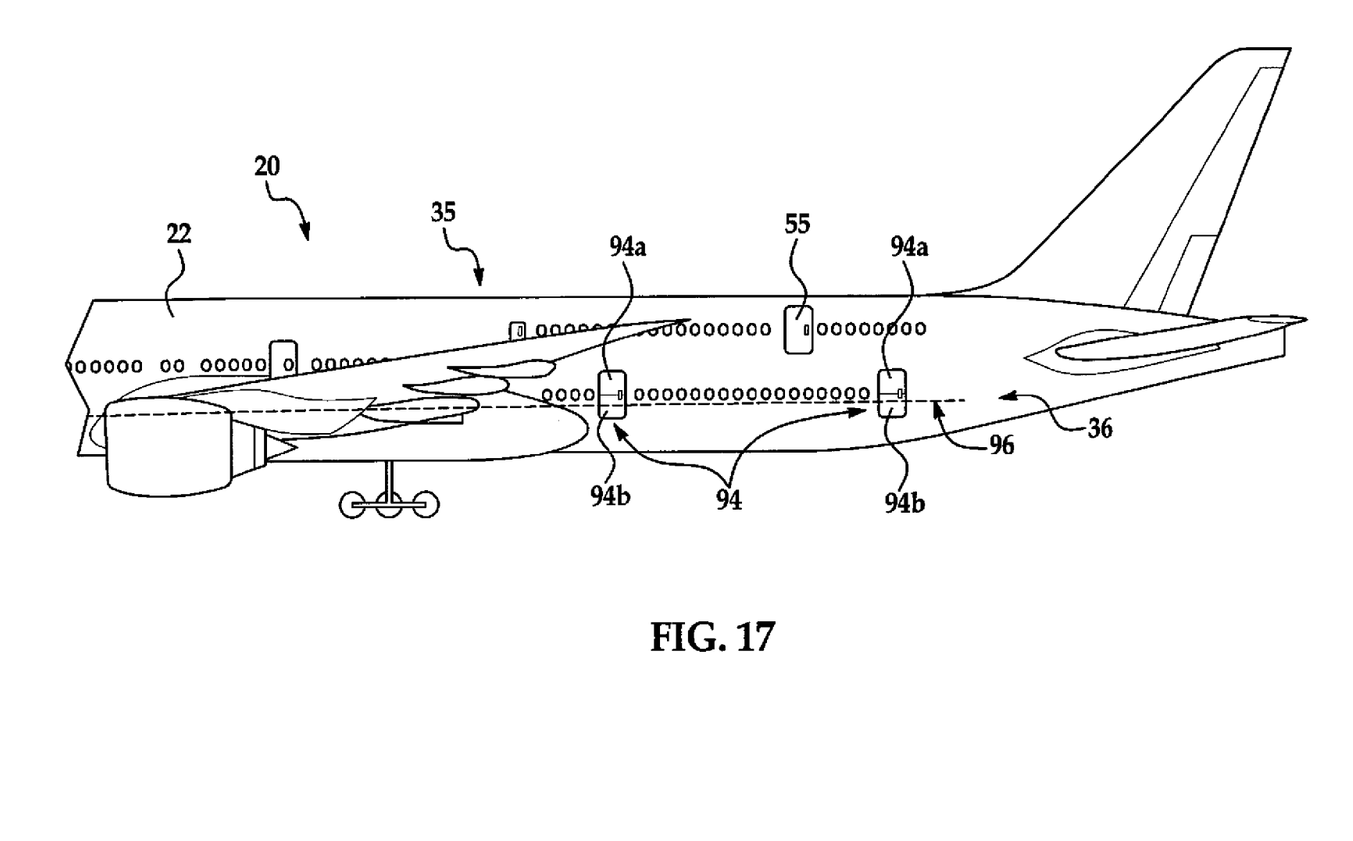
FIG. 17 is an illustration of a side view of the rear portion of an aircraft having split level cabins, showing the waterline of the aircraft and the use of horizontally divided doors in the lower cabin.

Attention is now directed to FIG. 17 which illustrates a rear portion of an aircraft 20 having a split level cabin 35 according to the disclosed embodiments. In this example, the aircraft 20 has an imaginary waterline 96 which represents the water level on the aircraft 20 in the event it must ditch in a body of water, where the aircraft 20 would float for a period of time. The lower aft cabin 36 may be partially located below the waterline 96. In order to allow emergency egress of passengers, horizontally split doors 94 are provided in the fuselage 22 at the level of the lower cabin 36. Each of the doors 94 includes upper and lower portions 94a, 94b which may be swung open independently of each other. Both portions 94a, 94b may be opened for normal land use. However, when evacuating in water, only the upper portion 94a is opened to allow passengers to climb over the upper sill of the lower portion 94b of the door 94 to evacuate the aircraft 20 onto a raft or slide raft (not shown). The lower door portion 94b which, because it is partially below the waterline 96, remains closed to prevent inflow of water while passengers may exit from the cabin 36 while the upper door portion 94a is open. If slide rafts are used during an evacuation, they may also be deployed over the upper sill of the lower portion 94b. The split doors 94, sometimes referred to as "dutch doors", may be employed with any of the embodiments previously described.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An aircraft, comprising:
   a fuselage;
   a first cabin in the fuselage having a first floor;
   a split level cabin longitudinally spaced from the first cabin, the split level cabin including an upper second cabin having a second floor above the level of the first floor, and a lower third cabin beneath the upper second cabin and having a third floor below the level of the first floor; and
   a lower hold in the fuselage beneath at least a portion of the lower third cabin.

2. The aircraft of claim 1, wherein the second and third cabins and the lower hold are vertically stacked within the fuselage.

3. The aircraft of claim 1, wherein the second and third cabins are located forward of the first cabin in the direction of the travel of the aircraft.

4. The aircraft of claim 1, wherein the second and third cabins are located aft of the first cabin in the direction of the travel of the aircraft.

5. The aircraft of claim 1, further comprising:
means for allowing passengers to traverse between the first cabin and each of the second and third cabins.

6. The aircraft of claim 5, wherein the means for allowing passengers to traverse includes:
a first set of stairs at one end of the split level cabin for allowing passengers to traverse between the first cabin and the second and third cabins, and
a second set of stairs at the opposite end of the split level cabin for allowing passengers to traverse directly between the second and third cabins.

7. The aircraft of claim 5, wherein the means for allowing passengers to traverse includes at least one of:
stairs,
an escalator, and
an elevator.

8. The aircraft of claim 1, further comprising:
a cargo deck at least partially beneath the first cabin.

9. The aircraft of claim 8, wherein the lower hold has a height that is less than the height of the cargo deck.

10. The aircraft of claim 8, further comprising:
a landing gear wheel well within the fuselage and below the first floor,
wherein one of the lower hold and the cargo deck is located forward of the wheel well and the other of the lower hold and the cargo deck is located aft of the wheel well.

11. The aircraft of claim 10, further comprising:
a wing assembly attached to the fuselage, the wing assembly including a wing box passing transversely through the fuselage below the first floor and forward of the wheel well,
the lower hold being located aft of the wheel well, and the cargo deck being located forward of the wing box.

12. The aircraft of claim 1, wherein the fuselage includes:
a first portion having a substantially constant cross sectional shape along its length, and
second and third portions respectively on opposite ends of the first portion and having cross sectional shapes smaller than the cross sectional shape of the first portion,
wherein each of the first, second and third cabins extend into the first portion and one of the second and third portions of the fuselage.

13. The aircraft of claim 1, further comprising:
an upper compartment stacked above the first cabin, the upper compartment having a fourth floor above the level of the second floor; and
means for allowing passengers or crew to traverse between the second cabin and the upper compartment.

14. The aircraft of claim 1, further comprising:
a fourth cabin stacked above the first cabin and having a fourth floor; and
a cargo deck located beneath the first floor, and
wherein the fuselage includes—
a first section having a first substantially constant cross section along its length and having first crown height, and
a second section having a second substantially constant cross section along its length and having a second crown height less than the first crown height,
the first and fourth cabins being at least partially contained within the first section of the fuselage, and
the second and third cabins being at least partially contained within the second section of the fuselage.

15. The aircraft of claim 1, further comprising a crushable zone within the fuselage beneath the third cabin for absorbing energy of an impact of the fuselage with the ground during a crash landing.

16. The aircraft of claim 15, wherein:
the fuselage includes a keel, and
the crushable zone includes at least approximately 30 inches of vertical height between the third floor and the keel inclusive.

17. The aircraft of claim 16, wherein the lower hold forms a portion of the crushable zone.

18. The aircraft of claim 1, further comprising:
at least a first door in the fuselage at the level of the first cabin for loading one of passengers and cargo into the first cabin;
at least a second door in the fuselage at the level of the second cabin for loading one of passengers and cargo into the second cabin;
at least a third door in the fuselage at the level of the third cabin for loading one of passengers and cargo into the third cabin; and
at least a fourth door in the fuselage at the level of the lower hold for loading at least one of cargo and aircraft systems into the lower hold.

19. The aircraft of claim 18, wherein the third door includes upper and lower portions that may be opened independently of each other.

20. The aircraft of claim 1, wherein:
the fuselage includes a substantially constant cross section along a portion of its length, and
at least portions of the first, second and third cabins are contained within the portion of the fuselage having a substantially constant cross section.

21. The aircraft of claim 1, wherein the lower hold has dimensions allowing the lower hold to carry at least one of:
bulk cargo,
LD3-45 cargo containers,
LD3-45 W containers,
LD3-46 containers,
LD3-46W containers, and
limited height cargo pallets.

22. An aircraft, comprising:
a fuselage;
a first cabin in the fuselage having a first floor;
a split level cabin longitudinally spaced from the first cabin, the split level cabin including an upper second cabin having a second floor above the level of the first floor, and a lower third cabin beneath the upper second cabin and having a third floor below the level of the first floor;
a lower hold in the fuselage beneath at least a portion of the lower third cabin; and
powered transport means for vertically transporting payloads between the first, second and third cabins.

23. The aircraft of claim 22, wherein the transport means includes an elevator longitudinally positioned within the fuselage proximal to both the first cabin and the split level cabin and adapted to transport galley carts between the first, second and third cabins.

* * * * *